(12) United States Patent
Flake et al.

(10) Patent No.: US 8,271,310 B2
(45) Date of Patent: Sep. 18, 2012

(54) VIRTUALIZING CONSUMER BEHAVIOR AS A FINANCIAL INSTRUMENT

(75) Inventors: Gary W. Flake, Bellevue, WA (US); Alexander G. Gounares, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1023 days.

(21) Appl. No.: 11/765,685

(22) Filed: Jun. 20, 2007

(65) Prior Publication Data

US 2008/0154741 A1  Jun. 26, 2008

Related U.S. Application Data

(60) Provisional application No. 60/870,926, filed on Dec. 20, 2006.

(51) Int. Cl.
*G06Q 40/00* (2012.01)
(52) U.S. Cl. ...................... 705/7.11; 705/7.35
(58) Field of Classification Search ................ 705/7.11, 705/7.35, 7
See application file for complete search history.

(56) References Cited

U.S. PATENT DOCUMENTS

| | | |
|---|---|---|
| 4,570,227 A | 2/1986 | Tachi |
| 5,179,519 A | 1/1993 | Adachi et al. |
| 5,220,507 A | 6/1993 | Kirson |
| 5,608,635 A | 3/1997 | Tamai |
| 5,774,878 A * | 6/1998 | Marshall ............ 705/36 R |
| 5,835,881 A | 11/1998 | Trovato et al. |
| 5,911,773 A | 6/1999 | Mutsuga |
| 5,950,172 A | 9/1999 | Klingman |
| 6,078,865 A | 6/2000 | Koyanagi |
| 6,119,065 A | 9/2000 | Shimada et al. |
| 6,129,274 A | 10/2000 | Suzuki |
| 6,298,304 B1 | 10/2001 | Theimer |
| 6,334,110 B1 | 12/2001 | Walter et al. |
| 6,339,746 B1 | 1/2002 | Sugiyama et al. |
| 6,405,175 B1 | 6/2002 | Ng |
| 6,477,460 B2 | 11/2002 | Kepler |
| 6,526,350 B2 | 2/2003 | Sekiyama |
| 6,622,089 B2 | 9/2003 | Hasegawa et al. |
| 6,694,252 B2 | 2/2004 | Ukita |
| 6,728,635 B2 | 4/2004 | Hamada et al. |
| 6,748,225 B1 | 6/2004 | Kepler |
| 6,898,518 B2 | 5/2005 | Padmanabhan |
| 6,952,647 B2 | 10/2005 | Hasegawa et al. |
| 7,103,473 B2 | 9/2006 | Ranjan |
| 7,587,352 B2 * | 9/2009 | Arnott ............ 705/36 T |
| 7,703,030 B2 | 4/2010 | Smirin et al. |
| 2001/0007968 A1 | 7/2001 | Shimazu |

(Continued)

OTHER PUBLICATIONS

Habel. "Incremental Generation of Multimodal Route Instructions," http://www.cs.niu.edu/-nlgdial/final/SS703CHabel.pdf, last access Dec. 11, 2006, 8 pages, Hamburg, Germany.

(Continued)

*Primary Examiner* — Thomas Dixon
*Assistant Examiner* — Benjamin S Fields
(74) *Attorney, Agent, or Firm* — Shook, Hardy & Bacon L.L.P.

(57) ABSTRACT

The claimed subject matter relates to an architecture that can characterize an item involved in a consumer transaction and/or a behavior of a consumer as a virtual financial instrument. The architecture can monitor the future performance of the virtual instrument in order to identify trendspotters as well as trend followers in a particular market domain.

15 Claims, 11 Drawing Sheets

U.S. PATENT DOCUMENTS

| | | | |
|---|---|---|---|
| 2001/0025223 | A1 | 9/2001 | Geiger et al. |
| 2002/0116266 | A1 | 8/2002 | Marshall |
| 2002/0116348 | A1 | 8/2002 | Phillips et al. |
| 2002/0123930 | A1 | 9/2002 | Boyd et al. |
| 2002/0133402 | A1 | 9/2002 | Faber et al. |
| 2002/0164998 | A1 | 11/2002 | Younis |
| 2002/0173905 | A1 | 11/2002 | Jin et al. |
| 2003/0171980 | A1* | 9/2003 | Keiser et al. ............. 705/10 |
| 2003/0182052 | A1 | 9/2003 | DeLorme et al. |
| 2004/0267604 | A1 | 12/2004 | Gross |
| 2006/0031062 | A1 | 2/2006 | Bakis et al. |
| 2006/0212220 | A1 | 9/2006 | Bou-Ghannam et al. |
| 2006/0218577 | A1 | 9/2006 | Goodman et al. |
| 2006/0271277 | A1 | 11/2006 | Hu et al. |
| 2007/0043583 | A1 | 2/2007 | Davulcu et al. |

OTHER PUBLICATIONS

Eugenio, et al. "Generating driving directions for intelligent vehicles interfaces," 12th IEEE International Conference and Workshops on the Engineering of Computer-Based Systems, 2005, 8 pages.

MapmyIndia Rocks Indian Web 2.0 with GoogleMap Type Digitised Mapping, http://www.webyantra.net/2006/09/16/mapmyindia-rocks-indian-web20-with-googlemap-type-digitised-mapping/, 8 pages.

Koleszar. ""A Landmark-Based Location Reference Grid for Street Maps,""http://trid.trb.org/view.aspx?id=143474, last accessed Aug. 5, 2011, 1 page.

"PDA Toshiba," http://www.citynotebookcentre.com.au/Products/PDA&CELL/Toshiba/Toshiba_pda_e740.htm, 3 pages.

Hampe et al. "Integrating topographic information and landmarks for mobile navigation," http://www.ikg.uni-hannover.de/publikationen/publikationen/2003/wien_hampe_elias.pdf, last accessed Mar. 14, 2007,13 pages.

May et al. "Presence and Quality of Navigational Landmarks: Effect on Driver Performance and Implications for Design," http://magpie.Iboro.ac.ukldspace/bitstream/2134/227711/PUB284.pdf, last accessed Mar. 14, 2007, 40 pages, Loughborough, United Kingdom.

Assessing Spatial Distribution of Web Resources for Navigation Services; http://www.sli.unimelb.edu.aullomko/publicationsllomko04case.pdf.

Non-Final Office Action mailed Jun. 22, 2009 in U.S. Appl. No. 11/769,439.

Final Office Action mailed Jan. 19, 2010 in U.S. Appl. No. 11/769,439.

Non-Final Office Action mailed Jun. 9, 2010 in U.S. Appl. No. 11/769,439.

Final Office Action mailed Feb. 16, 2011 in U.S. Appl. No. 11/769,439.

Non-Final Office Action mailed Jan. 19, 2011 in U.S. Appl. No. 11/862,683.

Final Office Action mailed Jun. 2, 2011 in U.S. Appl. No. 11/862,683.

International Search Report with Written Opinion dated May 15, 2008 (PCT/US2007/086700).

Non-Final Office Action mailed May 26, 2011 in U.S. Appl. No. 11/769,449.

International Search Report with Written Opinion dated Apr. 10, 2008 (PCT/US2007/086643).

Final Office Action mailed Dec. 6, 2011 in U.S. Appl. No. 11/769,449, 23 pages.

* cited by examiner

VIRTUALIZING CONSUMER BEHAVIOR AS A FINANCIAL INSTRUMENT

CROSS-REFERENCE TO RELATED APPLICATIONS

This application claims the benefit of U.S. Provisional Application Ser. No. 60/870,926, filed Dec. 20, 2006, entitled "ARCHITECTURES FOR SEARCH AND ADVERTISING." The entirety of this application is incorporated herein by reference.

BACKGROUND

Some individuals are endowed with an ability to be "trendspotters", while many other individuals are substantially trend followers. For example, trend followers tend to be interested in goods or services that are already popular or share a substantial amount of commercial success, whereas trendspotters have a knack for ferreting out a good or service well in advance of the popularity or success the item later attains. Across disparate categories, an individual may behave as one or the other or a combination of the two. For instance, when buying movies released on digital versatile disc (DVD), the individual may substantially behave as a trend follower. Yet when buying a compact disc (CD) or downloading music online, the individual might be very apt at buying music in one genre that later becomes popular and/or commercially successful, whether or not the individual is aware of such an aptitude; but may behave as a trend follower in other genres of music.

In many market domains, the number of sales of a good or service is largely dominated by a seasonal or cyclical trend. Accordingly, sales projections can, in those cases, sometimes be accurately and reliably made based upon past sales of the good or service, or based upon past sales of a similar product or service. However, in other market domains, especially in the case of an emerging good or service and/or a good or service based upon artistic endeavors, analysis of sales trend data is generally far less certain. In these markets, sales are not dominated by cyclical trends, but rather by market forces such as fads, whim, or other subjective characteristic that, in the aggregate prove to be very difficult to forecast.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one aspect thereof, comprises a computer-implemented architecture that can characterize an item (e.g., a good or service for which sales are not dominated by a cyclical trend) involved in a consumer transaction as a virtual financial instrument. In accordance therewith, the architecture can monitor consumer transactions such as purchases or ratings of the item in order to acquire a wide range of data relating to the transaction as well as to the consumer and item involved in the transaction.

In one aspect, the architecture can construct a virtual financial instrument, such as a virtual share for the item. Based potentially upon sales trend data (e.g., a number of sales of the item at the time or time period of the consumer transaction), the virtual share can be issued at a virtual price representative of sales. Over time, the virtual price can be updated periodically in a similar manner. Hence, if the item sees immense commercial success, then the virtual price of the virtual share will rise commensurately. On the other hand, if the item sees very little or declining commercial success, then the virtual price will remain low or decline as well.

According to one aspect, the virtual shares for each consumer respectively can be categorized into one or more virtual portfolios, wherein each virtual portfolio can be based upon one or more market domain classifications. In accordance therewith, virtual portfolios that show a high performance can be suggestive of a consumer who is a trendspotter for the associated market domain. By identifying trendspotters, the architecture can leverage the trendspotter's skills or aptitudes in a variety of ways. For example, the trendspotter's expertise can be solicited to make judgments relating to potential future commercial success of items. Moreover, decisions regarding sales or marketing for items within the trendspotter's specialization can employ data acquired from the trendspotter's behavior.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
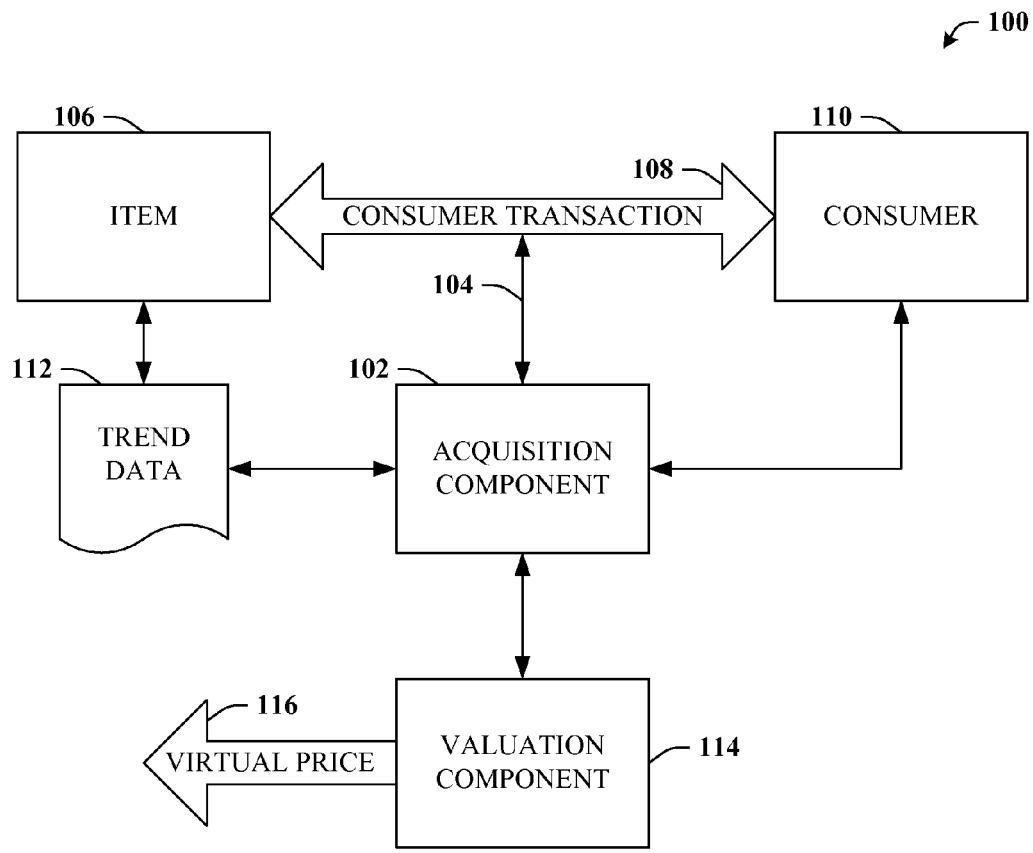
FIG. 1 illustrates a block diagram of a system that can characterize an item involved in a consumer transaction as a virtual financial instrument.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", or the like can refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g. card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawing, with reference initially to FIG. 1, a computer-implemented system 100 that can characterize an item involved in a consumer transaction as a virtual financial instrument is depicted. Generally, the system 100 can include an acquisition component 102 that can obtain transaction data 104 related to an item 106 that is involved in a consumer transaction 108. As used herein, the item 106 is generally intended to be a good or service for which sales are responsive to and/or markedly affected by fads or fashion. In particular, sales for the item 106 typically do not follow—or are at least not substantially governed by—seasonal or cyclical sales patterns. Thus, item 106 can be a good or service for which future sales are not easy or even impossible to accurately predict or project based upon historical sales data of the good or service or based upon historical sales data of a similar good or service.

Examples of goods or services 106 that are responsive to faddish trends rather than seasonal or cyclical trends are often (though not necessarily required to be) related to artistic works or endeavors. For example, a good 106 can be a manuscript or book, a compact disc (CD) of a song or album, a digital versatile disc (DVD) of a movie, an electronic copy of any of the foregoing, a painting or sculpture, a or even a hybrid automobile. Examples of a service 106 can include a play, concert, movie, and so forth. Future sales for any of the foregoing may not be reliably predictable based on past sales, but more controlled by the whims of consumers (e.g., consumer 110).

It is to be appreciated that newly emerging products or services can initially qualify as an item 106, then after some period of time, lose that status. An illustration of such a case can be provided by the hybrid automobile example indicated supra. When the product 106 first emerges on the market, there are no historical sales by which to project future sales, and a look to similar products (e.g., gasoline or diesel automobiles) will likely be fruitless for making predictions about the sale of the hybrid automobile. Moreover, the hybrid automobile may follow a faddish trend after it is released to the market, but then after, say, several months or a few years, sales of the hybrid automobile may turn and start following a cyclical or seasonal pattern common to other cars or durable goods. In the first time period, the hybrid automobile may be an item 106 within the scope and spirit of the appended claims, but in the second time period (e.g., once faddish sales trends are replaced by cyclical trends), the hybrid automobile may not be an item 106.

Continuing with the description of FIG. 1, the consumer transaction 108 is most commonly a purchase of the item 106 by the consumer 110. However, it is to be appreciated that in accordance with an aspect of the claimed subject matter, the consumer transaction 108 can be a rating of the item 106. As will be described in more detail infra, one potential objective of the acquisition component 102 can be to determine whether the consumer 110 likes or approves of the item 106.

A purchase of the item 106 is often a reliable indicator of such (e.g., voting with the pocketbook). Yet, an explicit rating can be a reliable indicator as well. For example, often a consumer must first purchase the item 106 before the full affect of the item 106 can be gauged, and thus, while the purchase may be an indication of approval, a subsequent negative rating can override such a determination. Accordingly, the transaction data 104 that is obtained by the acquisition component 102 can include a type of the consumer transaction (e.g., a purchase or a rating), which is further detailed in connection with FIG. 2.

Figure 2:
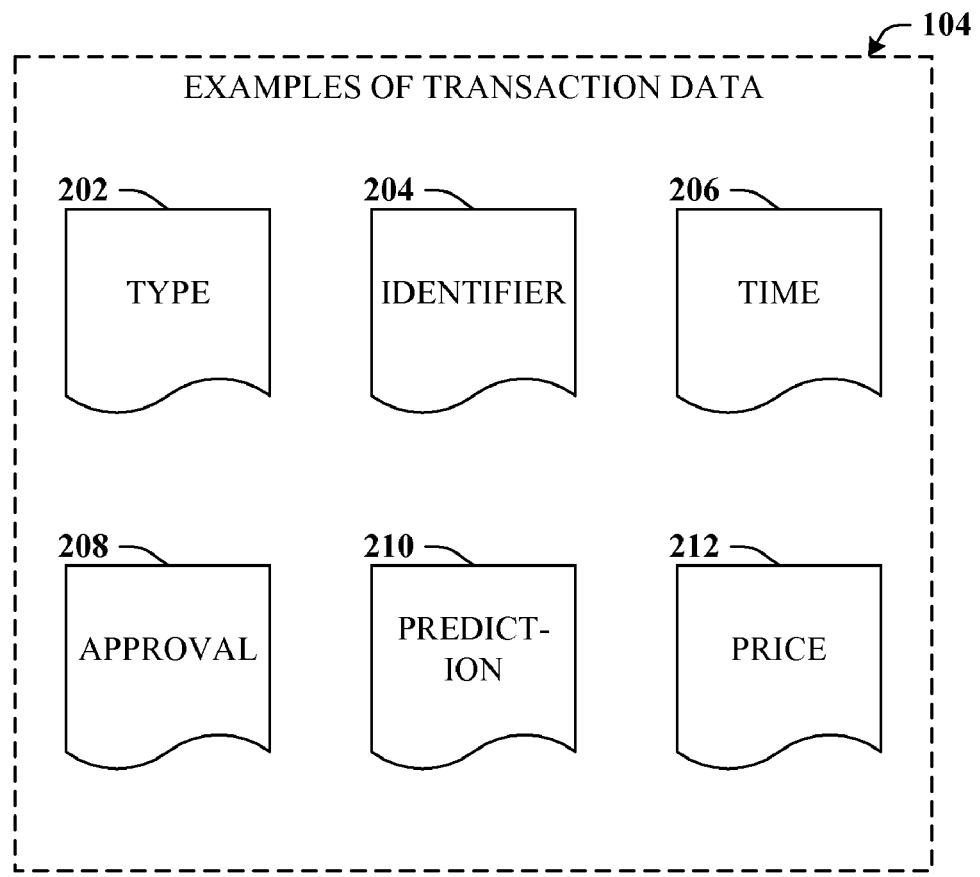
FIG. 2 is a block diagram illustrating several examples of potential transaction data.

While still referring to FIG. 1, but turning also to FIG. 2, a block diagram illustrating several examples of potential transaction data 104 is provided. As previously indicated, the transaction data 104 can include a type 202 of consumer transaction 108, which can be an indication of whether the consumer transaction 108 is a purchase or a rating. The transaction data 108 can also include an identifier 204 associated with the consumer 110 involved in the transaction 108. Generally, the identifier 204 is unique and/or capable of distinguishing between transactions 108 by consumer 110 and those of any other potential consumer 110. The transaction data 104 can further include an indication of a time 206 in which the consumer transaction 108 occurred, such as a time stamp.

Further still, the transaction data 104 can include an indication of whether the item 106 meets with approval 208. It is to be appreciated that the approval 208 can be expressly indicated in some cases, while in others the approval 208 can be dynamically inferred by the acquisition component 102. The inference can be based upon other transaction data 104 as well as numerous other data sets, such as suitable demographic data associated with the consumer 110, histories or patterns associated with purchases or ratings, and so on. In particular, the acquisition component 102 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In accordance with the claimed subject matter, yet another example that can be included in the transaction data 104 can be a prediction 210 by the consumer 110 relating to future commercial success of the item 106. In addition, the transaction data 104 can also include a price 212 for the item at the time 206 of the consumer transaction 108. It is to be appreciated that the acquisition component 102 can employ the price 212 in a variety of ways that can be useful to what is claimed and/or described herein. For example, since a purchase of the item 106 can be inferred to indicate approval 208 of the item 106, an analysis of the price 212 paid can yield additional information.

For example, whether the price 212 paid by the consumer 110 for the item 106 is above, below, or in accord with an average price for the item 106 can be indicative of a weight to apply to the approval 208 or other transaction data 104. If the consumer 110 pays well above the average price for the item 106, then perhaps the consumer 110 has an inordinately high expectation or level of approval 208 for the item 106. Similarly, if the price 212 is deeply discounted, then any inference that the purchase is indicative of a vote of confidence or approval 208 can be suitable adjusted, as the consumer 110 may only have made the transaction 108 due to the very low price 212. Even in situations in which the consumer transaction 108 is a rating rather than a purchase, the listed price 212 can still be of use. For instance, the consumer 110 may indicate a high level of satisfaction or approval 208 for the item 106 in the rating, yet the fact that the consumer 110 did not make a purchase even at a very low price 212 (but only gave a rating) may be indicative that the rating is not in earnest or only of marginal weight.

As previously described, the acquisition component 102 can obtain transaction data 104 related to an item 106 involved in a consumer transaction 108. In addition, the acquisition component 102 can also obtain trend data 112 associated with the item 106. The system 100 can also include a valuation component that assigns a virtual price 116 to the item 106, wherein the virtual price 116 can be a function of the trend data 112. It is to be appreciated that the trend data 112 can include a sales history of the item 106, which is further detailed in connection with FIGS. 3A and 3B.

Figure 3A:
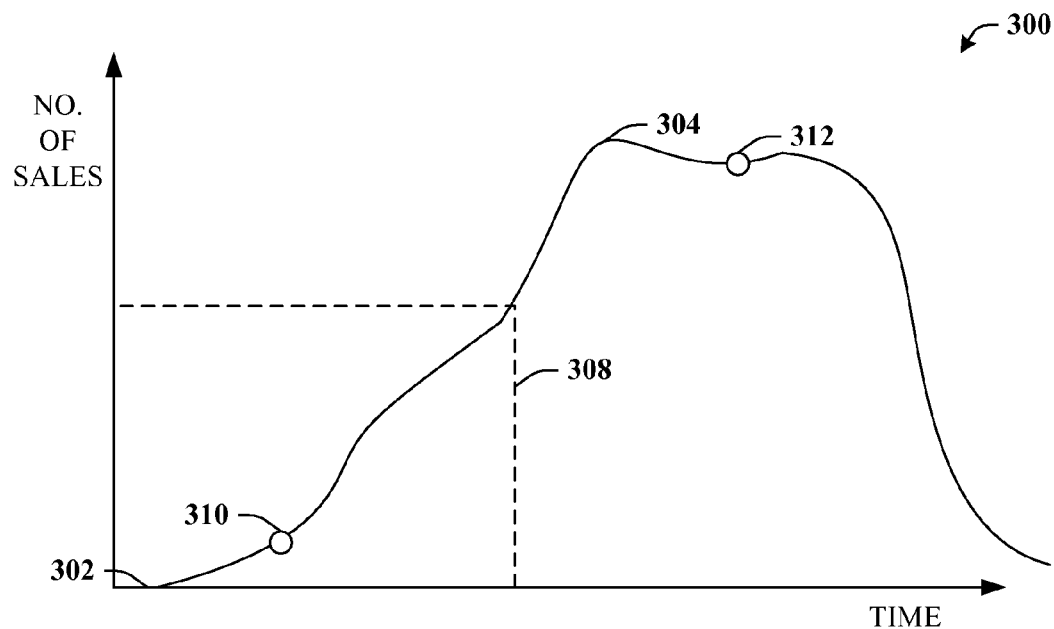
FIG. 3A depicts a graph of a sales history for an exemplary item 106 that underwent a robust faddish trend.
Figure 3B:
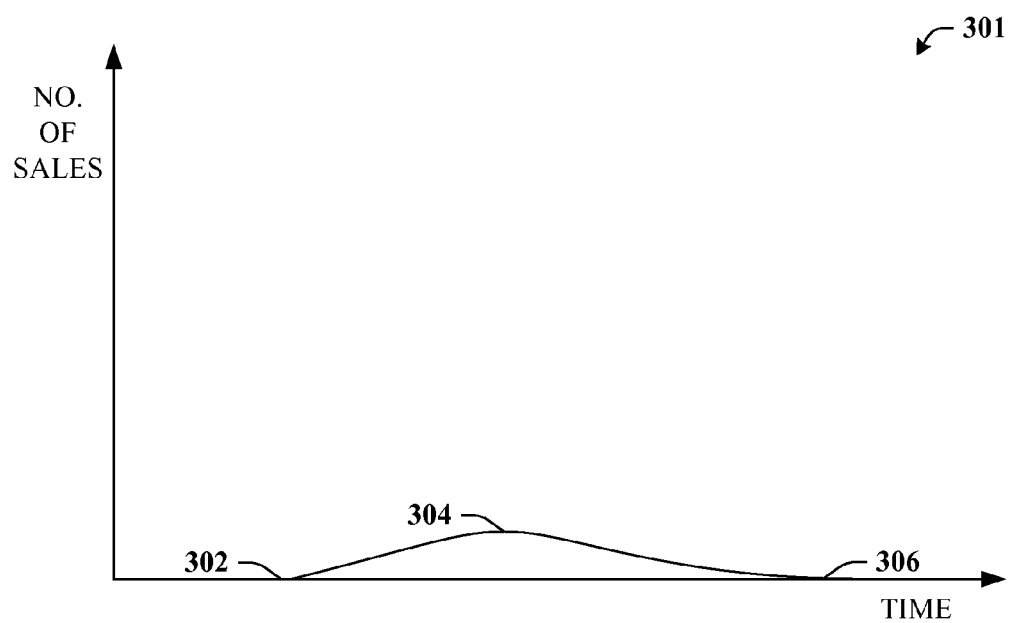
FIG. 3B depicts a graph of a sales history for an exemplary item that had a relatively short market life and did not attain significant popularity and/or number of sales.

While again still referring to FIG. 1, but turning now to FIGS. 3A and 3B, exemplary sales history graphs 300 and 301 are illustrated. For both graphs 300 and 301, the number of sales of the respective item 106 is illustrated over time. Reference numeral 302 represents the first sale and/or the introduction of the respective item 106 to the market. Reference numeral 304 represents a local peak number of sales for both graphs 300 and 301 for the available sales history. Reference numeral 306 of graph 301 illustrates sales falling to zero, which may indicate there is no longer a market for the product. Graph 300 does not fall to zero within the current time period. Thus, later sales history graphs for the same item 106 may show such a drop to zero, alternatively show a rebound, or potentially even show a transition into a cyclical sales trend, for which only the sections prior to such a transition may be relevant.

Graph 300 illustrates a sales history for an exemplary item 106 that underwent a robust faddish trend. From the introduction to the market at 302, the item 106 gained in popularity as evidenced by the increasing number of sales up to the peak at 304. In contrast, graph 301 depicts a sales history for an exemplary item 106 that had a relatively short market life and did not attain significant popularity and/or number of sales. Referring specifically to graph 300, the dashed line 308 represents an arbitrary positioning for a popularity threshold. The location of line 308 can based upon a certain number of sales above which popularity for the item 106 is attained, or be based a time after which predictive indicators relating to the future commercial success of the item are generally less relevant.

Accordingly, in either case, a consumer transaction 108 that occurs prior to the item 106 becoming popular (e.g., transaction 310) can be viewed differently from a consumer transaction 108 occurring after popularity of the item 106 is apparent (e.g., transaction 312). For example, transaction 310 can be suggestive of a consumer 110 who is a trendspotter or who has an innate ability to select items 106 (at least in some market domains) that eventually become popular and/or achieve significant commercial success. On the other hand, transaction 312 can be suggestive of a consumer 110 who is a trend follower and/or likes items 106 that are already popular or simply because they are popular. Additional details relating to these and other concepts are provided infra.

Figure 4:
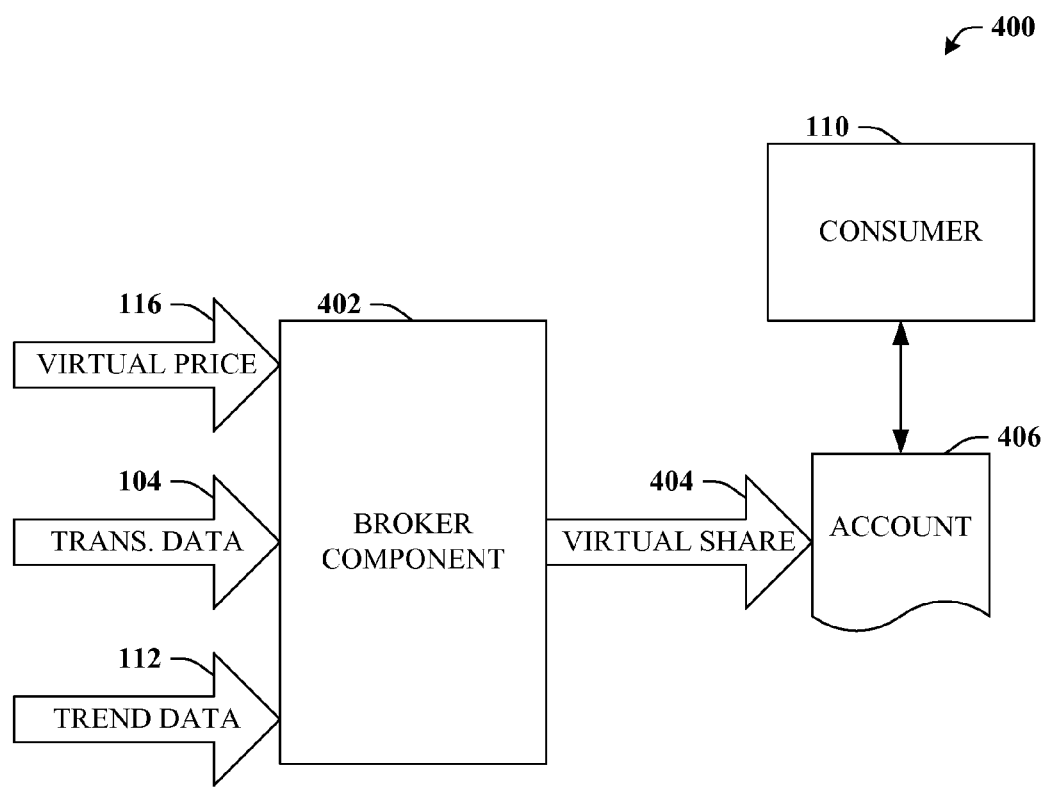
FIG. 4 illustrates a block diagram of a system that can construct a virtual financial instrument based upon consumer behavior.

While simultaneously referencing FIGS. 3 and 4, FIG. 4 illustrates a system 400 that can construct a virtual financial instrument based upon consumer behavior. In general, the system 400 can include a broker component 402 that can issue a virtual share 404 for an item (e.g., item 106 of FIG. 1) at the virtual price 116. As described supra, the virtual price 116 can be a function of the trend data 112 and/or the sales history of the item. For example, the virtual price 116 can be proportional to the number of sales. As such, it is readily apparent that a virtual share 404 issued as a result of transaction 310 will have a lower virtual price 116 than a virtual share 404 issued as a result of transaction 312.

It is to be appreciated that the broker component 402 can issue the virtual share 404 to an account 406 that can be associated with the consumer 110 involved in the transaction 310, 312. In addition, the broker component 402 can define the virtual share 404 as either of a virtual buy or a virtual short based upon at least one of the transaction data 104 or the trend data 112. For example, a virtual buy can be associated with a purchase or a positive rating (e.g. based upon transaction data 104) of the item. Likewise, a virtual short can be associated with transaction data 104 that carries a negative rating.

Figure 5:
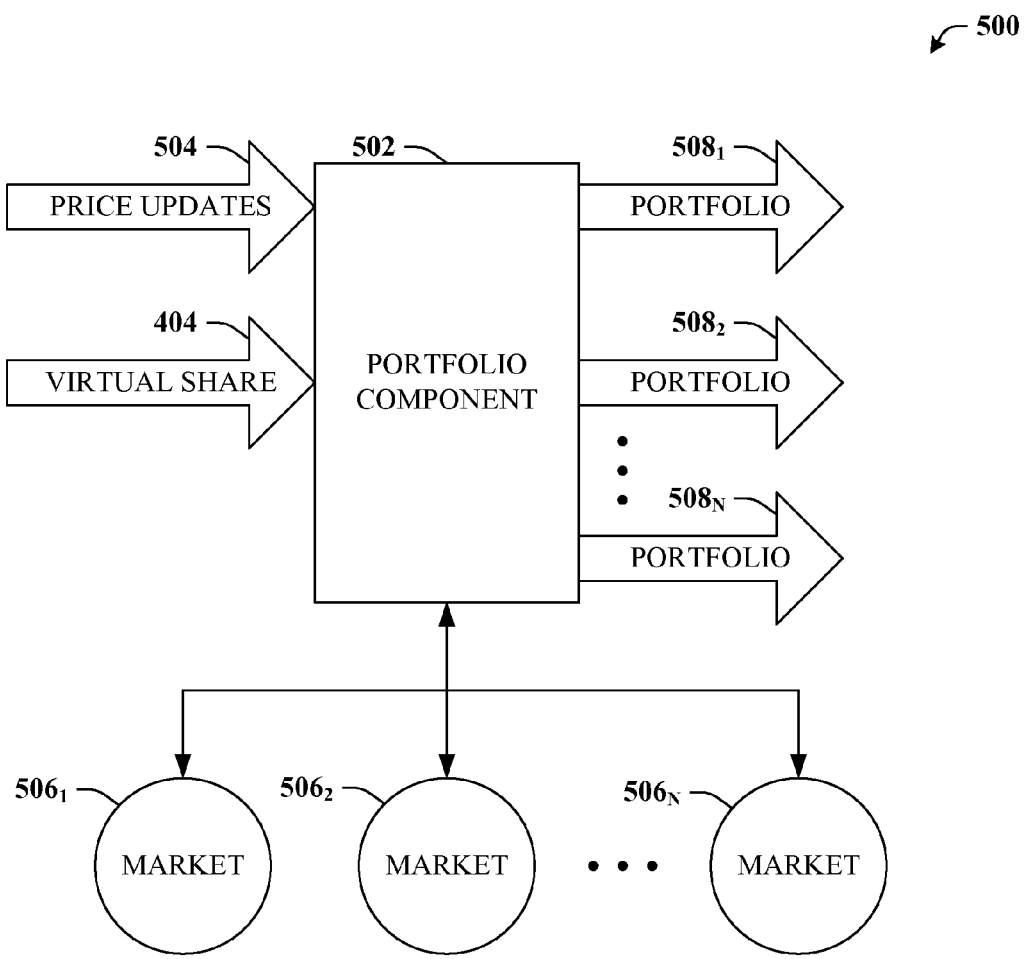
FIG. 5 is a block diagram of a system that can categorize consumer behavior into suitable market domains and can track individual consumer performance for each domain independently.

FIG. 5 depicts a system 500 that can categorize consumer behavior into suitable market domains and can track individual consumer performance for each domain independently. In general, the system can include a portfolio component 502 that can classify the virtual share 404 into one or more or more positive integer, N, markets $506_1$-$506_N$ (which can be referred to herein either individually or collectively as market(s) 506). It is to be appreciated that the markets 506 can be arbitrarily defined or based upon well-known classification data. In addition, the markets 506 and can be hierarchically constructed such that one market 506 is a subset of another market 506, while in other cases two distinct markets 506 can share portions of the same data. For example, a consumer transaction (e.g., purchase or rating) of a CD compilation can fall into multiple market 506 domains, one being, broadly, the music market 506 domain, and more narrowly markets 506, such as new age baroque or movie soundtracks, for example.

The portfolio component 502 can also create 1 to N virtual portfolios $508_1$-$508_N$ (referred to herein either collectively or individually as virtual portfolio(s) 508), such as creating one virtual portfolio 508 for each market 506, or, alternatively, creation of a virtual portfolio 508 for each market 506 in which an associated virtual share 404 is extent. In accordance therewith, it is readily apparent that a given virtual portfolio 508 can include all virtual shares 404 for a particular market 506. Moreover, over time, as sales of the item rise or fall (and/or popularity increases or decreases), the portfolio component 502 can receive periodic price updates 504, which can be reflections of the virtual price 116 assigned by the valuation component 114 of FIG. 1. The portfolio component 502 can apply the price updates 504 to the appropriate virtual share 404, thereby affecting the one or more virtual portfolios 508 for which the virtual share 404 is a member. It is to be further appreciated that the portfolio component 502 can monitor or track a performance of the virtual portfolios 508, which can lead to very interesting observations or inferences with respect to the consumers, which is further detailed with reference to FIG. 6.

Figure 6:
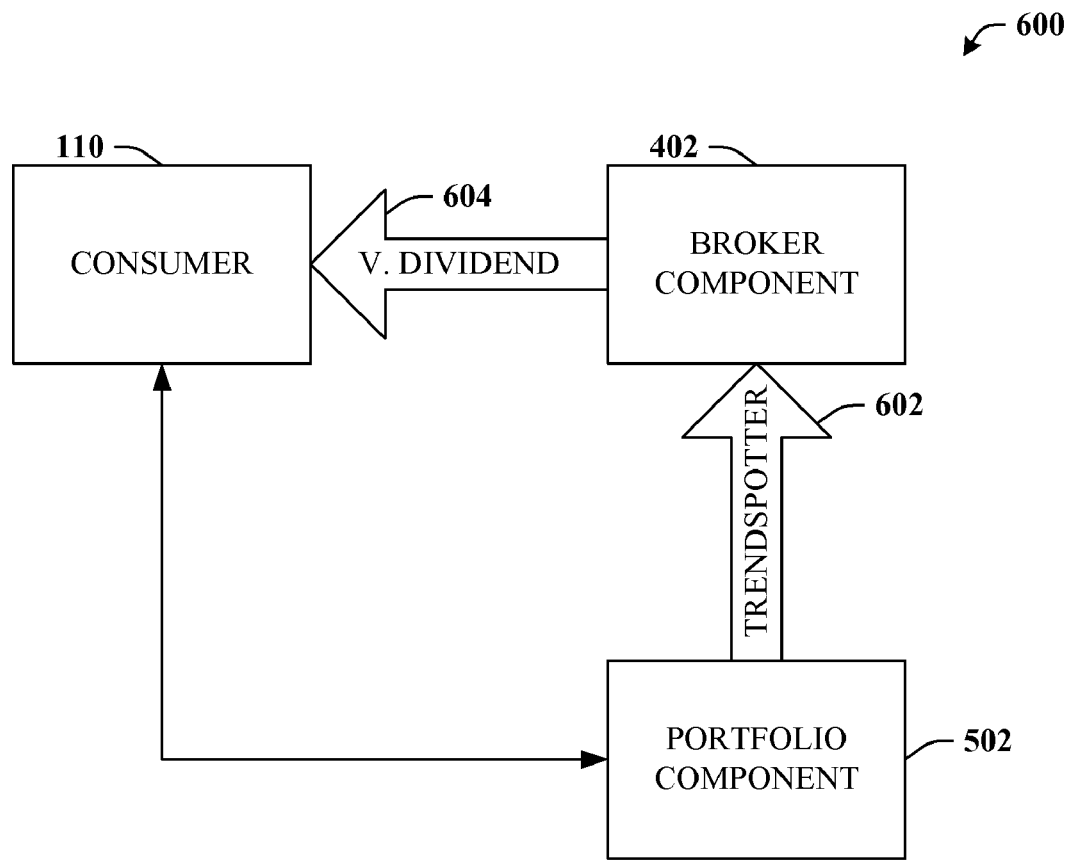
FIG. 6 illustrates a block diagram of a system that can classify and/or reward consumers based upon consumer behavior, participation, or performance.

Referring now to FIG. 6, a system 600 that can classify and/or reward consumers based upon consumer behavior, participation, or performance is depicted. The system 600 can include the portfolio component 502 that can track a performance of transactions involving the consumer 110, as substantially described supra. Based upon, e.g. the performance of one or more virtual portfolios 508, the associated consumer 110 can be identified as a trendspotter 602 or a trend follower. As indicated in connection with FIG. 3A, the consumer 110 involved in transaction 310 is more likely to be identified as a trendspotter 602, whereas the consumer 110 involved in transaction 312 is more likely to be identified as a trend follower.

Upon determining that the consumer 110 is a trendspotter 602, the portfolio component 502 can provide this information to the broker component 402. The broker component 402 can issue a virtual dividend 604 to the consumer 110 and/or to the consumer account 406 of FIG. 4. It should be appreciated that identification of a trendspotter 602 can be useful for a variety of reasons. For example, if the consumer 110 buys CDs or downloads tracks of music that tend to later become popular, then that consumer's 110 future purchases of music stand a good chance of becoming popular as well. Moreover, virtually any person or entity can be a consumer 110 by doing little or nothing more than what he or she might do anyway: buy music he or she likes.

Even so, the virtual dividend 604 can be a way of rewarding trendspotters 602, or in some cases other consumers 110 as well. According to one aspect of the claimed subject matter, the virtual dividend 604 can be a function of performance. For example, a trendspotter 602 who's consumer transactions 108 very accurately predict eventual popularity and/or do so well in advance of the eventual popularity may receive a larger virtual dividend 604 than another who is not quite so accurate or not nearly as far in advance. The distinctions between the two aforementioned trendspotters 602 can be captured by way of respective performances of one or more virtual portfolios 508.

In another aspect, the virtual dividend can be in exchange for a new or additional consumer transaction 108. In effect, in this case, the virtual dividend 604 can be provided as an incentive to purchase or rate more items 106. It is to be appreciated that the virtual dividend 604 can be a discount or subsidy (e.g., half off on the next music purchase, a free CD of the consumer's 110 choice, . . . ) as well as a rebate or a monetary award (e.g., earning points for past purchases, a fractional market share or finders' fee for high performance transactions, . . . ).

Figure 7:
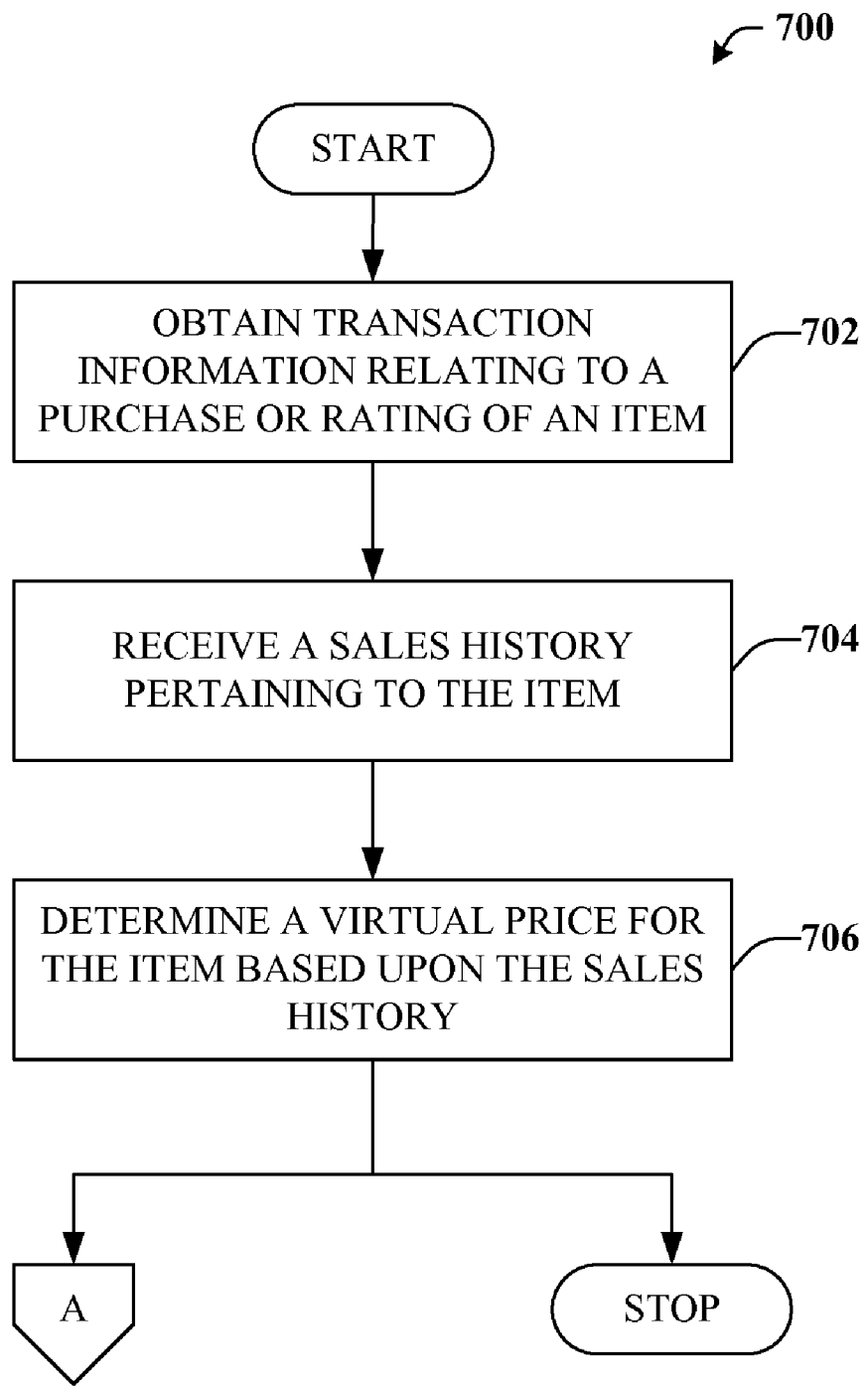
FIG. 7 is an exemplary flow chart of procedures that define a method for characterizing consumer transaction information as a virtual financial instrument.
Figure 8:
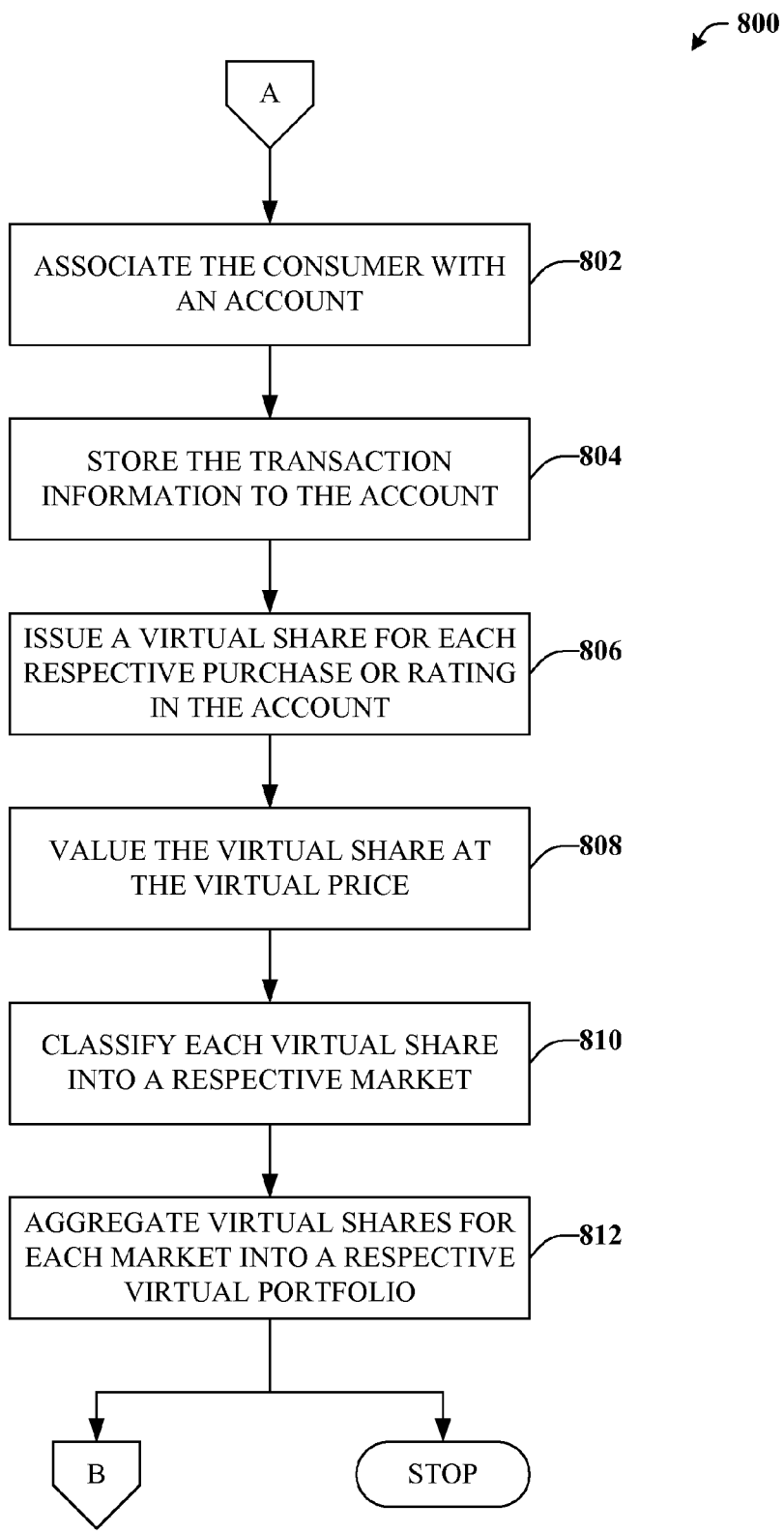
FIG. 8 is an exemplary flow chart of procedures that define a method for issuing and managing virtual financial instruments.
Figure 9:
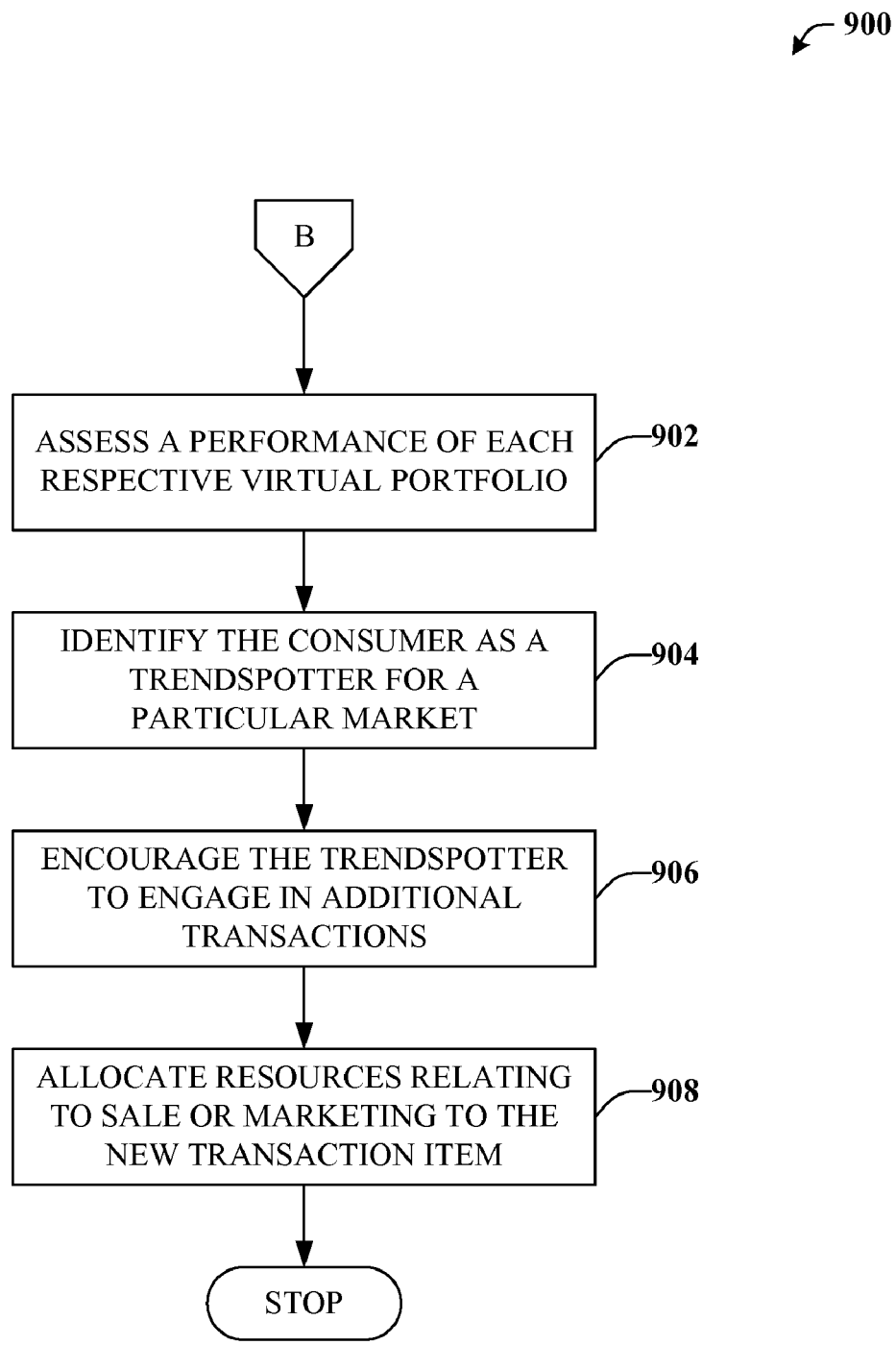
FIG. 9 depicts an exemplary flow chart of procedures defining a method for examining virtual portfolios for identifying and/or rewarding trendspotters.

FIGS. 7, 8, and 9 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 7, an exemplary method 700 for characterizing consumer transaction information as a virtual financial instrument is illustrated. Generally, at reference numeral 702, transaction information relating to a purchase or a rating of an item by a consumer can be obtained. Typically, a purchase or a positive rating can correlate with a consumer's likes, whereas a negative rating can correlate with the consumer's dislikes. Most commonly, the item is an item that is responsive to faddish trends rather than an item in which sales are dominated by seasonal and/or cyclical trends.

At reference numeral 704, a sales history pertaining to the item can be received. The sales history can, e.g. include a number of sales of the item over time up to the time of the transaction, effectively demonstrating the current sales trend. At reference numeral 706, a virtual price for the item can be determined based upon the sales history. Generally, the virtual price is proportional to and/or a function of the number of sales of the item within a time period of the transaction.

With reference now FIG. 8, an exemplary method 800 for issuing and managing virtual financial instruments is provided. At reference numeral 802, the consumer involved in the purchase or rating can be associated with an account. At reference numeral 804, the transaction information obtained at act 702 can be stored to the account.

In accordance therewith, at reference numeral 806, a virtual share can be issued for each respective purchase or rating stored in the account. It is to be appreciated that at reference numeral 808, the virtual share issued can be valued at the virtual price determined at act 706. In addition, at reference numeral 810, each virtual share issued to the account can be classified into a respective market, whereas, at reference numeral 812, virtual shares for each market can be aggregated into a respective virtual portfolio. Thus, each virtual portfolio in a consumer account will generally only contain virtual shares for purchases or ratings of items within a single market category.

Turning briefly to FIG. 9, an exemplary method 900 for examining virtual portfolios for identifying and/or rewarding trendspotters is depicted. At reference numeral 902, the performance of each respective virtual portfolio can be assessed. In particular, based upon a time in which a consumer engaged in a purchase or rating, an associated virtual share will be issued at a particular price. Over time, as sales histories for the item are received, the virtual share price can be updated according to whether sales were seen to increased or decreased. Thus, virtual portfolios that perform well (e.g., a net gain in value with respect to all the virtual shares within the virtual portfolio) are indicative of a consumer who can predict or precede successful faddish trends, at least within the given market tied to the overperforming portfolio.

In accordance therewith, at reference numeral 904, such a consumer can be identified as a trendspotter for the associated market domain. Upon identification of the trendspotter, at reference numeral 906, the trendspotter can be encouraged to engage in additional transactions. For example, the trendspotter can be provided coupons, prizes, a fractional market share, or the like. At reference numeral 908, resources relating to sale or marketing can be allocated to an item associated with the additional transactions. For instance, since the trendspotter is known to be able to effectively predict successful trends in at least one market domain (whether or not the trendspotter herself is aware of this skill), the incentives potentially provided at act 906 can be, e.g., a sample for several emerging items within the trendspotter's market domain, with the right to receive one of the items for free. The item the trendspotter selects may later prove to be commercially successful, and, thus, can be allocated additional sale or marketing resources.

Figure 10:
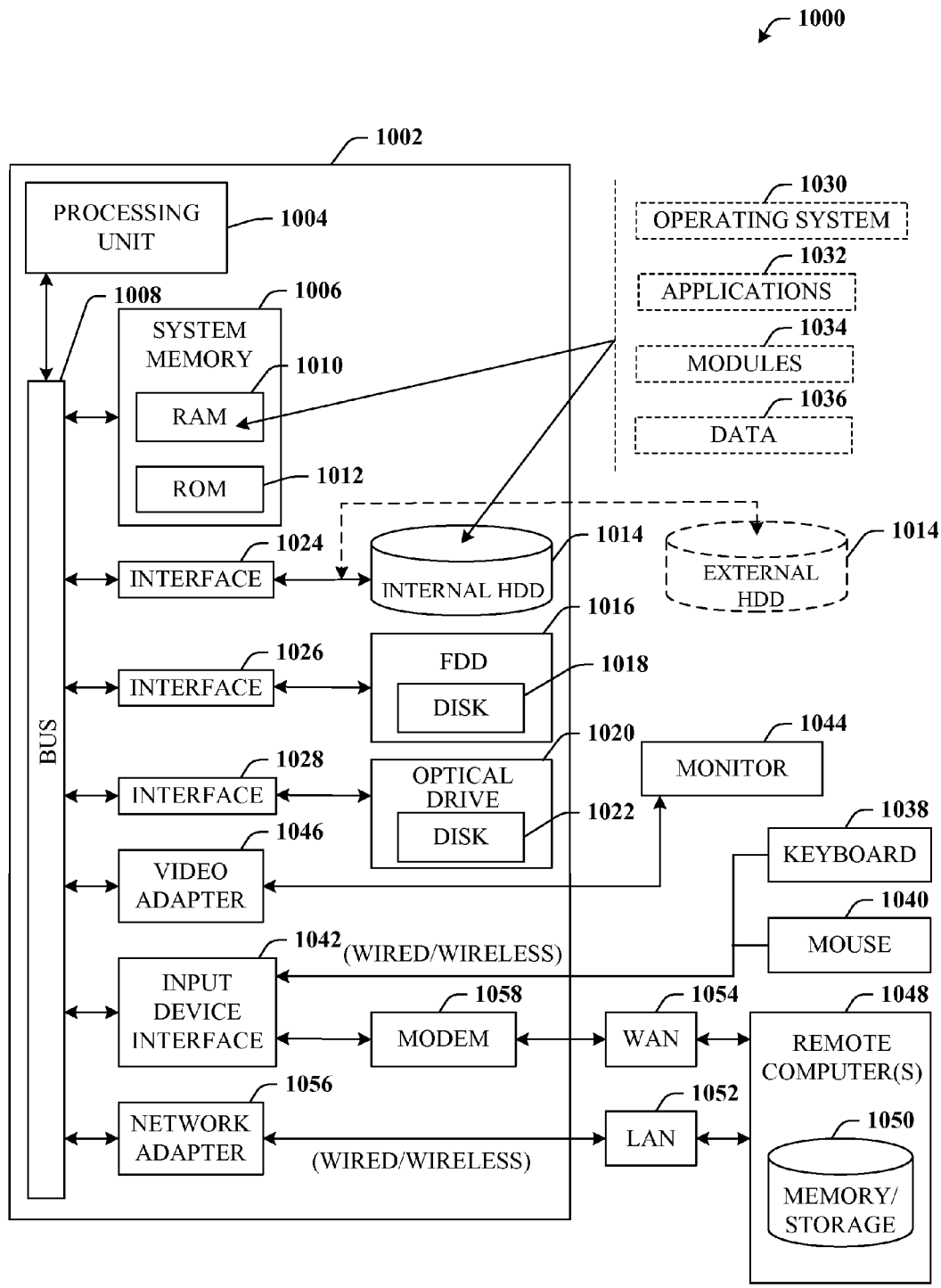
FIG. 10 illustrates a block diagram of a computer operable to execute the disclosed architecture.

Referring now to FIG. 10, there is illustrated a block diagram of an exemplary computer system operable to execute the disclosed architecture. In order to provide additional context for various aspects of the claimed subject matter, FIG. 10 and the following discussion are intended to provide a brief, general description of a suitable computing environment 1000 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the claimed subject matter includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g. a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g. a wide area network (WAN) 1054. Such LAN and WAN networking environments are commonplace in offices and companies, and facilitate enterprise-wide computer networks, such as intranets, all of which may connect to a global communications network, e.g. the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g. computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
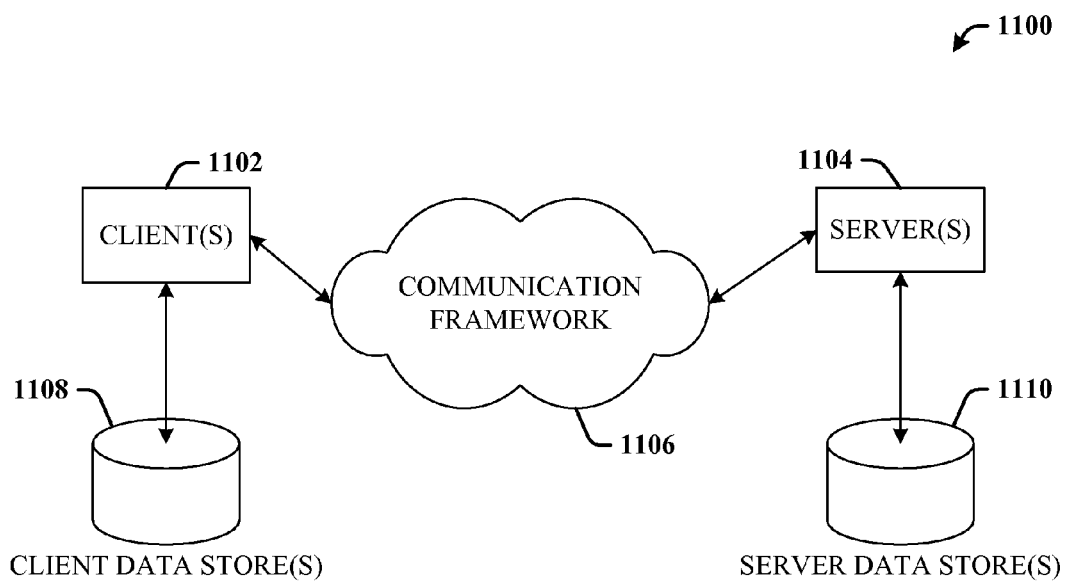
FIG. 11 illustrates a schematic block diagram of an exemplary computing environment.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g. a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented system that characterizes an item involved in a consumer transaction as a virtual financial instrument, comprising: an acquisition component that obtains transaction data related to an item involved in a consumer transaction, and further obtains trend data associated with the item; a valuation component that assigns a virtual price to the item, the virtual price is a function of the trend data; a broker component that issues a virtual share of the item at the virtual price to an account associated with a consumer involved in the transaction, wherein the broker component defines the virtual share as either a virtual buy or a virtual short based upon at least one of the transaction data or the trend data; and a portfolio component that classifies a virtual share into one or more markets and creates a virtual portfolio for each market, periodically receives virtual price updates from the valuation component to track performance of each virtual portfolio, and identifies a consumer as a trendspotter, someone whose consumer transactions have predicted items that become popular for the particular market based upon the performance.

2. The system of claim 1, the item is a good or service for which sales of the item are substantially impacted by non-seasonal or non-cyclical sales trends.

3. The system of claim 1, the consumer transaction is a purchase of the item.

4. The system of claim 1, the consumer transaction is a rating of the item.

5. The system of claim 1, the transaction data includes a type of consumer transaction.

6. The system of claim 1, the transaction data includes at least one of a unique identifier associated with a consumer involved in the transaction, a time stamp of a time of the consumer transaction, an indication of whether the item meets with approval, a prediction of future commercial success of the item, or a price paid for the item.

7. The system of claim 1, the trend data includes a sales history of the item.

8. The system of claim 1, wherein the virtual portfolio includes all virtual shares for a particular market.

9. The system of claim 1, the broker component issues a virtual dividend to the account associated with a trendspotter.

10. The system of claim 9, the virtual dividend is a function of the performance.

11. The system of claim 9, the virtual dividend is issued in exchange for a new consumer transaction.

12. The system of claim 9, the virtual dividend is a discount, a subsidy, a rebate, or a monetary reward.

13. Computer storage media storing computer-executable instructions that, when executed by one or more computing devices, cause the one or more computer devices to perform a method for characterizing consumer transaction information as a virtual financial instrument, comprising:

obtaining transaction information relating to a purchase or a rating of an item by a consumer;

receiving a sales history pertaining to the item;

determining a virtual price for the item based upon the sales history;

associating the consumer with an account;

storing the transaction information to the account;

issuing a virtual share for each respective purchase or rating in the account;

valuing the virtual share at the virtual price;

classifying each virtual share in the account into a respective market;

aggregating virtual shares for each market into a respective virtual portfolio;

assessing a performance of each respective virtual portfolio; and identifying the consumer as a trendspotter, someone whose consumer transactions have predicted items that become popular, for a particular market based upon the performance of an associated virtual portfolio.

14. The media of claim 13, further comprising at least one of the following acts:

encouraging the trendspotter to engage in additional transactions; or allocating resources relating to sale or marketing to the item associated with the additional transactions.

15. A computer-implemented system that characterizes an item involved in a consumer transaction as a virtual financial instrument, comprising:

an acquisition component for receiving transaction information pertaining to a purchase or a rating of an item by a consumer and obtaining a sales history pertaining to the item;

a valuation component for utilizing the sales history for assigning a virtual price to the item;

a broker component that issues a virtual share of the item at the virtual price to an account associated with a consumer involved in the transaction; and a portfolio component that creates a portfolio comprising the virtual share for each item within a respective market and identifies the consumer as a trendspotter, someone whose consumer transactions have predicted items that become popular, based on a performance of the portfolio.

\* \* \* \* \*